(12) United States Patent
Yu et al.

(10) Patent No.: US 11,063,358 B2
(45) Date of Patent: Jul. 13, 2021

(54) STRUCTURE OF ELECTRONIC DEVICE FOR OPTIMIZING PERFORMANCE OF ANTENNA AND METHOD THEREOF

(71) Applicant: Samsung Electronics Co., Ltd., Suwon-si (KR)

(72) Inventors: Hyungjoon Yu, Suwon-si (KR); Youngjun Park, Suwon-si (KR); Myungjin Kang, Suwon-si (KR); Youngkwon Lee, Suwon-si (KR); Yongwoon Moon, Suwon-si (KR); Sangjun Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/899,838

(22) Filed: Jun. 12, 2020

(65) Prior Publication Data

US 2020/0403311 A1 Dec. 24, 2020

(30) Foreign Application Priority Data

Jun. 18, 2019 (KR) .......................... 10-2019-0071956

(51) Int. Cl.
*H01Q 5/335* (2015.01)
*H04W 88/06* (2009.01)
(Continued)

(52) U.S. Cl.
CPC .............. *H01Q 5/335* (2015.01); *H01Q 23/00* (2013.01); *H04W 88/06* (2013.01); *H04W 84/042* (2013.01)

(58) Field of Classification Search
CPC ....... H01Q 5/335; H01Q 23/00; H04W 88/06; H04W 84/042
(Continued)

(56) References Cited

U.S. PATENT DOCUMENTS 8,015,490 B2 9/2011 Ogikubo
8,478,212 B2 7/2013 Moon et al.
(Continued)

FOREIGN PATENT DOCUMENTS

JP H04-160903 A 6/1992
KR 10-2009-0066361 A 6/2009
(Continued)

OTHER PUBLICATIONS

Extended European Search Report dated Oct. 9, 2020, issued in European Patent Application No. 20180540.5.
(Continued)

*Primary Examiner* — Lee Nguyen
(74) *Attorney, Agent, or Firm* — Jefferson IP Law, LLP

(57) ABSTRACT

An electronic device for supporting carrier aggregation (CA) is provided. The electronic device includes a radio frequency integrated circuit (RFIC) including a plurality of mixers and a feedback circuit, at least one antenna, a coupler disposed between the RFIC and the at least one antenna to transfer a reflected signal of a transmission signal to the feedback circuit, and at least one processor operatively connected to the RFIC, wherein the at least one processor may identify whether there is a mixer which is not in use among the plurality of mixers, when the first mixer which is not in use among the plurality of mixers is identified, perform antenna impedance tuning through a first mixer and the feedback circuit, and when the plurality of mixers are all in use, perform the antenna impedance tuning through a second mixer assigned to a secondary cell (Scell) among the plurality of mixers and the feedback circuit.

20 Claims, 9 Drawing Sheets

(51) Int. Cl.
  *H01Q 23/00*    (2006.01)
  *H04W 84/04*    (2009.01)
(58) Field of Classification Search
  USPC .......................................... 455/193.1–193.2
  See application file for complete search history.

(56)  References Cited

U.S. PATENT DOCUMENTS

| | | |
|---|---|---|
| 8,639,205 B2 | 1/2014 | Deng et al. |
| 8,971,388 B2 | 3/2015 | Tu et al. |
| 9,438,314 B2 | 9/2016 | Moon et al. |
| 9,693,238 B2 | 6/2017 | Hu et al. |
| 2009/0239592 A1 | 9/2009 | Deng et al. |
| 2012/0157021 A1 | 6/2012 | Moon et al. |
| 2013/0257174 A1 | 10/2013 | Moon et al. |
| 2014/0105336 A1 | 4/2014 | Deng et al. |
| 2014/0169418 A1 | 6/2014 | Tu et al. |
| 2015/0305035 A1 | 10/2015 | Hu et al. |
| 2017/0048859 A1* | 2/2017 | Hayakawa ................. H03F 3/24 |
| 2017/0272108 A1* | 9/2017 | Filipovic .............. H04B 7/0619 |
| 2018/0183388 A1 | 6/2018 | Pham |
| 2019/0268954 A1* | 8/2019 | Yu ........................ H04B 1/0475 |
| 2019/0296789 A1* | 9/2019 | Yu .......................... H04B 1/401 |

FOREIGN PATENT DOCUMENTS

| | | |
|---|---|---|
| KR | 10-2020-0027302 A | 3/2020 |
| WO | 2018/119384 A1 | 6/2018 |

OTHER PUBLICATIONS

International Search Report dated Oct. 13, 2020, issued in International Patent Application No. PCT/KR2020/007465.

* cited by examiner

STRUCTURE OF ELECTRONIC DEVICE FOR OPTIMIZING PERFORMANCE OF ANTENNA AND METHOD THEREOF

CROSS-REFERENCE TO RELATED APPLICATION(S)

This application is based on and claims priority under 35 U.S.C. § 119(a) of a Korean patent application number 10-2019-0071956, filed on Jun. 18, 2019, in the Korean Intellectual Property Office, the disclosure of which is incorporated by reference herein its entirety.

BACKGROUND

1. Field

The disclosure relates to a structure of an electronic device for optimizing the performance of an antenna and a method therefor.

2. Description of Related Art

An electronic device such as a user equipment (UE) may provide various services to a user by performing wireless communication using an antenna. For example, the electronic device may provide a voice call service, such as voice over long term evolution (VoLTE), by using a long term evolution (LTE) protocol defined by a 3rd generation project partnership (3GPP). The electronic device may provide a user with a fast connection speed and a higher quality call as compared to an existing circuit network through VoLTE.

The radiation performance of the antenna may be an important factor in determining the quality of VoLTE. It is necessary to optimize the radiation performance of the antenna by adjusting the parameters of the antenna because the radiation performance of the antenna may be changed by various factors.

The above information is presented as background information only to assist with an understanding of the disclosure. No determination has been made, and no assertion is made, as to whether any of the above might be applicable as prior art with regard to the disclosure.

SUMMARY

Methods for optimizing antenna performance (or radiation performance) may vary. For example, the electronic device may measure an in-phase/quadrature-phase (I/Q) value of a reflected signal and tune the antenna impedance based on the measured value. For another example, the electronic device may experimentally identify an optimal antenna impedance for each of various events affecting the antenna performance in advance, and tune an antenna impedance to a predetermined value when a specific event occurs. Antenna impedance tuning based on an I/Q value of a reflected signal may be referred to as closed loop antenna impedance tuning (CL-AIT), and antenna impedance tuning based on an event may be referred to as opened loop antenna impedance tuning (OL-AIT).

In the case of OL-AIT, the electronic device may not detect a state in which the radiation performance of an antenna decreases due to causes other than a specified event. In the case of CL-AIT, the electronic device needs to include a mixer capable of detecting a change in phase of the reflected signal in the RFIC to measure an I/Q value, and the mixer may cause a decrease in a mounting space and an increase in cost, leading to a difficulty of application of CL-AIT in an electronic device where the number of mixers is insufficient.

Aspects of the disclosure are to address at least the above-mentioned problems and/or disadvantages and to provide at least the advantages described below. Accordingly, an aspect of the disclosure is to provide a structure and method of an electronic device for optimizing the performance of an antenna using a mixer.

Additional aspects will be set forth in part in the description which follows and, in part, will be apparent from the description, or may be learned by practice of the presented embodiments.

In accordance with an aspect of the disclosure, an electronic device for supporting carrier aggregation (CA) is provided. The electronic device includes a radio frequency integrated circuit (RFIC) including a plurality of mixers and a feedback circuit, at least one antenna, a coupler disposed between the RFIC and the at least one antenna to transfer a reflected signal of a transmission signal to the feedback circuit, and at least one processor operatively connected to the RFIC, wherein the at least one processor may identify whether there is a mixer which is not in use among the plurality of mixers, when the first mixer which is not in use among the plurality of mixers is identified, perform antenna impedance tuning through a first mixer and the feedback circuit, and when the plurality of mixers are all in use, perform the antenna impedance tuning through a second mixer assigned to a secondary cell (Scell) among the plurality of mixers and the feedback circuit.

In accordance with another aspect of the disclosure, a method of supporting carrier aggregation (CA) in an electronic device is provided. The method includes identifying whether there is a mixer which is not in use among a plurality of mixers included in the electronic device, and performing antenna impedance tuning (AIT) through a first mixer when the first mixer which is not in use among the plurality of mixers is identified, performing the antenna impedance tuning through a second mixer assigned to a secondary cell (Scell) among the plurality of mixers when the plurality of mixers are all in use.

In accordance with another aspect of the disclosure, an electronic device for supporting carrier aggregation (CA) is provided. The electronic device includes a sensor, a radio frequency integrated circuit (RFIC) including a plurality of mixers and a feedback circuit, at least one antenna, a coupler disposed between the RFIC and the at least one antenna to transfer a reflected signal of a transmission signal to the feedback circuit, and at least one processor operatively connected to the sensor and the RFIC wherein the at least one processor may identify whether there is a mixer which is not in use among the plurality of mixers, when the first mixer which is not in use among the plurality of mixers is identified, performing antenna impedance tuning (AIT) through a first mixer and the feedback circuit, and when the plurality of mixers are all in use, identify whether at least one of specified conditions for closed loop (CL) antenna impedance tuning is satisfied, perform the antenna impedance tuning using the second mixer assigned to a secondary cell (S cell) among the plurality of mixers and the feedback circuit when the at least one of the specified conditions is satisfied, and perform the antenna impedance tuning based on an event detected through the sensor when the specified conditions are not satisfied.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
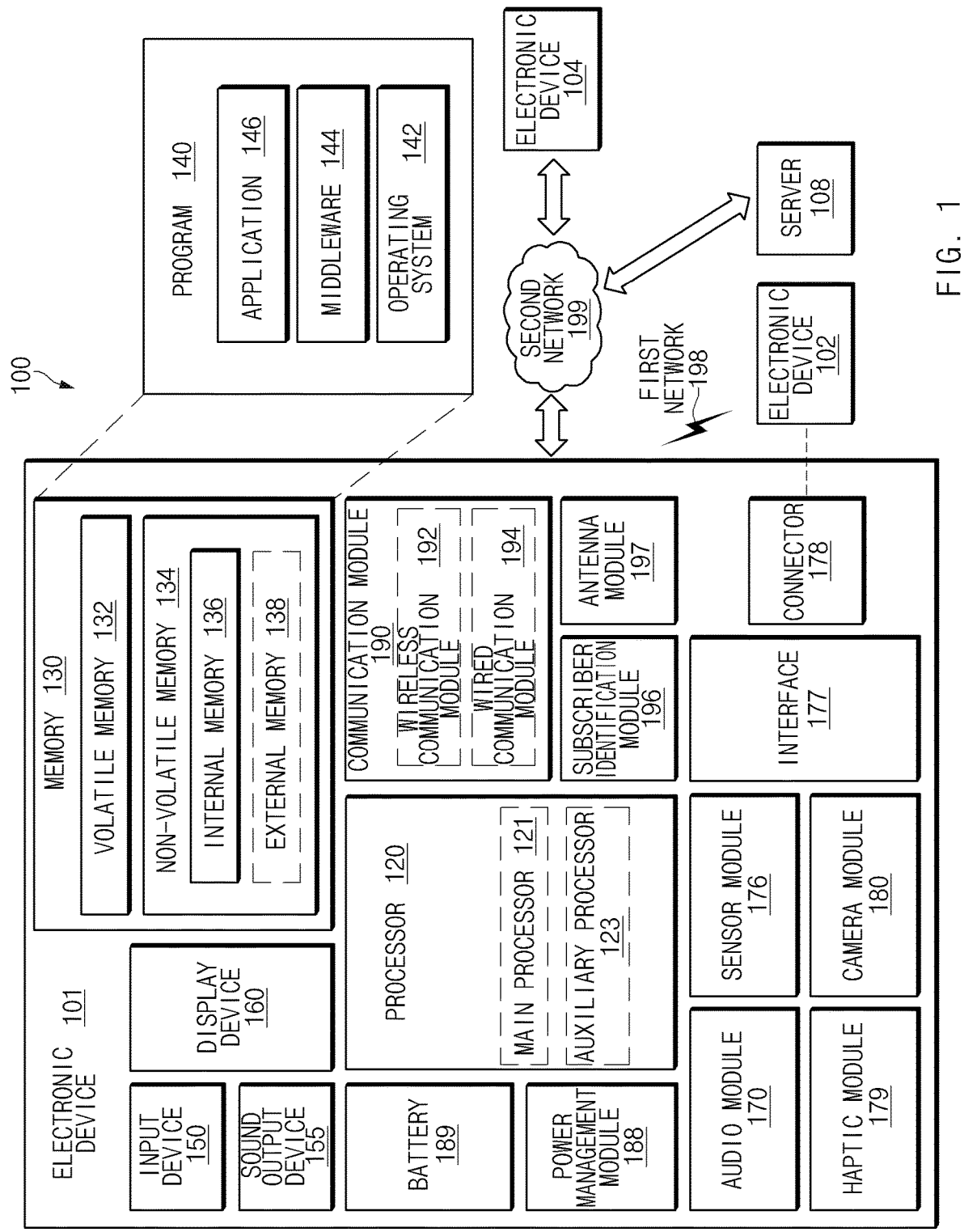
FIG. 1 is a block diagram illustrating an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, an USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., printed circuit board (PCB)). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
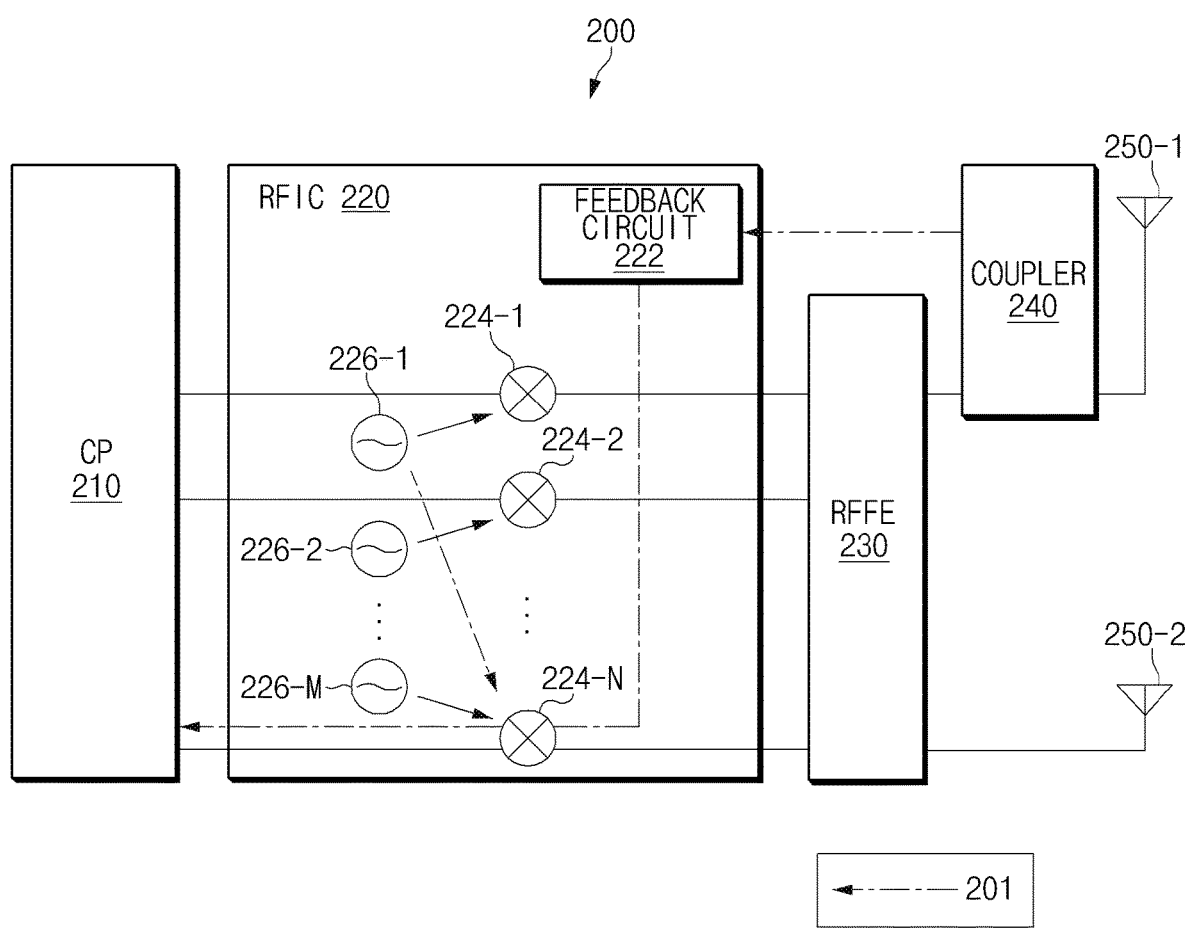
FIG. 2 is a block diagram illustrating some components of an electronic device according to an embodiment of the disclosure.

FIG. 2 is a block diagram illustrating some components of an electronic device according to an embodiment of the disclosure.

Referring to FIG. 2, the electronic device 101 may include a communication processor (CP) 210, a radio frequency integrated chip (RFIC) 220, a radio frequency front end (RFFE) 230, a coupler 240, and a plurality of antennas 250-1 and 250-2. The number of components shown in FIG. 2 is not limited to the illustrated example. For example, the electronic device 101 may further include one or more antennas, or exclude one of the plurality of antennas 250-1 and 250-2. The CP 210 may form at least a part of the processor 120 or wireless communication module 192 of FIG. 1, and the RFIC 220 and the RFFE 230 may form at least a part of the wireless communication module 192 of FIG. 1. In addition, the plurality of antennas 250-1 and 250-2 may form the antenna module 197 of FIG. 1.

According to an embodiment, the CP 210 may include a modem. The CP 210 may establish a communication channel in a frequency band to be used for wireless communication with a cellular network (e.g., the second network 199 of FIG. 1) or support network communication through the established communication channel.

According to an embodiment, the RFIC 220 may convert a baseband signal generated by the CP 210 into a radio frequency (RF) signal used in a cellular network. For another example, when an RF signal is received from a cellular network through an antenna (e.g., 250-1 or 250-2), the RFIC 220 may convert the obtained RF signal to a baseband signal so as to be processed by the CP 210.

According to an embodiment, the RFFE 230 may preprocess the RF signal. The RFFE 230 may include, for example, at least one of an amplifier (e.g., a pulse amplitude modulation (PAM) or low power amplifier) or a filter. According to an embodiment, the RFFE 230 may be a single module, and may include a transmission module that preprocesses a signal transmitted from the electronic device 101 and a reception module that preprocesses a signal received by the electronic device 101, separately.

According to an embodiment, the plurality of antennas 250-1 and 250-2 may support only transmission or reception of a signal, or both transmission and reception of a signal. For example, the electronic device 101 may transmit a signal through the first antenna 250-1 and receive a signal through the second antenna 250-2. For another example, when the electronic device 101 supports carrier aggregation (CA), the electronic device 101 may receive signals through the first antenna 250-1 and the second antenna 250-2.

When the electronic device 101 supports CA according to an embodiment, the RFIC 220 may include a plurality of mixers 224-1, 224-2, ..., 224-N (N is a natural number) and a plurality of oscillators 226-1, 226-2, ..., 226-M (M is a natural number), which may be assigned to a plurality of carrier components (CC). For example, a first CC (e.g., a primary cell (Pcell)) may be assigned to the first mixer 224-1, a second CC (e.g., secondary cell (Scell)) may be assigned to the second mixer 224-2, and an N-th CC (e.g., Scell) may be assigned to the N-th mixer 224-N. In this case, the plurality of oscillators 226-1, 226-2, ..., 226-M may be assigned to the plurality of mixers 224-1, 224-2, ..., 224-N, respectively. For example, the first mixer 224-1 may convert a baseband signal into an RF signal corresponding to the first CC using a signal generated by the first oscillator 226-1, the second mixer 224-2 may convert a baseband signal to an RF signal corresponding to the second CC using a signal generated by the second oscillator 226-2, and the N-th mixer 224-N may convert a baseband signal into an RF signal corresponding to the N-th CC using a signal generated by the M-th oscillator 226-M. The plurality of oscillators 226-1, 226-2, ..., 226-M may be local oscillators (LOs) that generate signals in a specified frequency band.

The CP 210 according to various embodiments may measure a signal magnitude of a reflected signal (or a reflected wave) transferred from the coupler 240 using a feedback circuit 222. Alternatively, the CP 210 may measure the magnitude and phase of a reflected signal using the feedback circuit 222 and a mixer. In this case, the CP 210 may obtain an I/Q value of the reflected signal based on the magnitude and/or phase of the reflected signal, and perform antenna impedance tuning based on the obtained I/Q value. The electronic device 101 according to various embodiments may perform antenna impedance tuning using at least one of a plurality of mixers 224-1, 224-2, ..., 224-N included in the RFIC 220 without including a dedicated mixer (not shown) for antenna impedance tuning, thus preventing an increase in manufacturing cost and a decrease in mounting space caused due to mounting of an additional mixer.

According to various embodiments, transmission or reception of signals through a specific mixer (e.g., CA operation) may be limited while the specific mixer is used for antenna impedance tuning, so that the electronic device 101 according to various embodiments may use some of the plurality of mixers 224-1, 224-2, ..., 224-N included in the RFIC 220 under limited conditions.

For example, the CP 210 may identify whether the CA is in operation through a CA configuration condition. The fact that the CA is not in operation may mean that there is a mixer that is not currently in use, and the CP 210 may perform antenna impedance tuning through a mixer that is not currently in use.

For another example, when a service (or a service having a high priority) having a quality of service (QoS) is to be guaranteed, such as VoLTE, although the CA is in operation, the electronic device 101 may perform antenna impedance tuning through a mixer assigned to the Scell (e.g., the N-th mixer 224-N). In this case, the CP 210 may back up the configuration information on the N-th mixer 224-N. The configuration information may include, for example, information on an oscillator (e.g., the M-th oscillator 226-M) assigned to the N-th mixer 224-N in a CA operation. When the configuration information is backed up, the CP 210 may assign a transmission LO (e.g., the first oscillator 226-1) to the N-th mixer 224-N to measure a reflected signal, and measure the reflected signal through the N-th mixer 224-N (e.g., a path 201). When the measurement of the reflected signal (or antenna impedance tuning) is completed, the CP 210 may restore the backed up configuration information and activate an Scell using the M-th oscillator 226-M and the N-th mixer 224-N.

Figure 3:
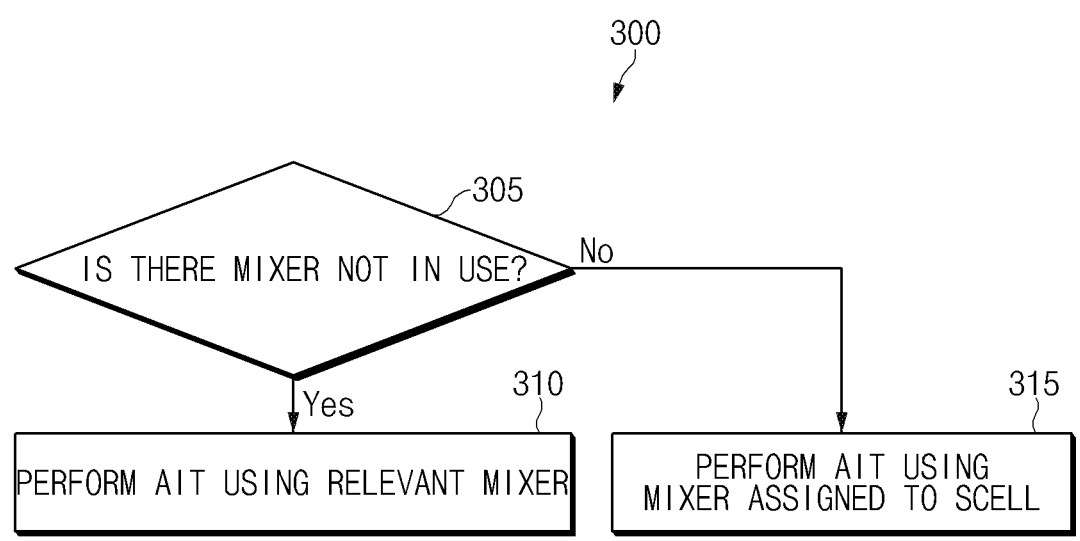
FIG. 3 is a method of an electronic device for performing antenna impedance tuning according to an embodiment of the disclosure.

FIG. 3 illustrates a method of an electronic device that performs antenna impedance tuning according to an embodiment of the disclosure. The method illustrated in FIG. 3 may be performed by the electronic device 101 or may be performed by a component included in the electronic device 101 (e.g., the CP 210 of FIG. 2).

Referring to FIG. 3, in a method 330, at operation 305, the electronic device 101 may identify whether there is a mixer that is not currently in use among a plurality of mixers included in an RFIC (e.g., the RFIC 220 of FIG. 2). For example, the electronic device 101 may identify whether the CA is in operation (or whether the Scell is activated) by identifying a CA configuration condition.

According to various embodiments, when there is a mixer that is not currently in use ('YES' in operation 305), in operation 310, the electronic device 101 may perform antenna impedance tuning through the mixer. For example, the electronic device 101 may switch a coupler (e.g., the coupler 240 of FIG. 2) included in the electronic device 101 from a forward direction (FWD) to a reverse direction (REV) to measure a reflected signal and assign an LO (e.g., the first oscillator 226-1 of FIG. 2) which generates a transmission signal to a mixer which is not in use. The electronic device 101 may perform antenna impedance tuning by measuring the reflected signal transferred from the coupler. When the antenna impedance tuning is completed, the electronic device 101 may switch the coupler from the reverse direction to the forward direction.

According to various embodiments, when the plurality of mixers included in the RFIC are all in use ('NO' in operation 305), in operation 315, the electronic device 101 may perform antenna impedance tuning through a mixer (e.g., the N-th mixer 224-N of FIG. 2) assigned to an Scell among the mixers which are in use for CA. Various embodiments of antenna impedance tuning using a mixer assigned to an Scell will be described in more detail with reference to FIG. 5.

Figure 4:
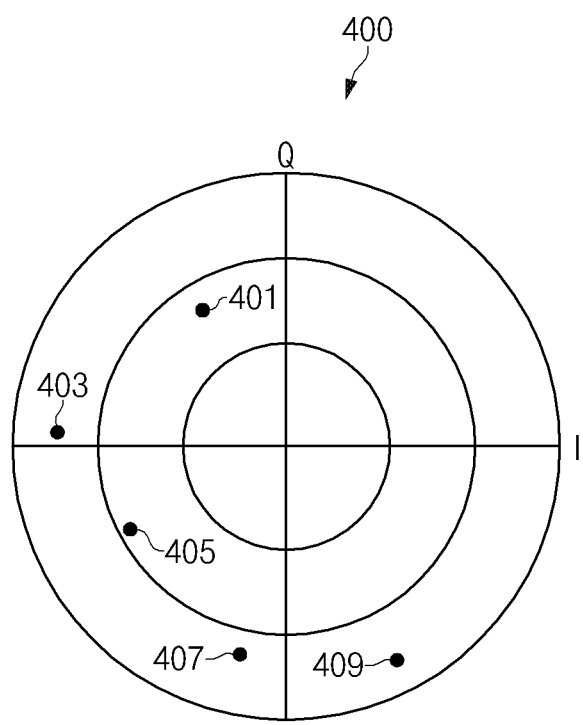
FIG. 4 is a graph illustrating an I/Q value of a reflected wave according to embodiment of the disclosure.

FIG. 4 illustrates a graph showing I/Q values of reflected waves according to an embodiment of the disclosure.

Referring to FIG. 4, in a graph 400, the electronic device 101 may obtain measured values (e.g., magnitude and phase) of reflected waves (or reflected signals) as I/Q values on a rectangular coordinate system. On graph 400, "I" represents a horizontal axis and "Q" represents a vertical axis. A measured value of a reflected wave may be (0,0) or adjacent to (0,0) when the antenna has been optimized through antenna impedance tuning. For example, the electronic device 101 may obtain a first measured value 401, a second measured value 403, a third measured value 405, a fourth measured value 407, and a fifth measured value 409. To optimize the performance of the antenna, the electronic device 101 may perform antenna impedance tuning to make the obtained measured values adjacent to an origin when the measured values are obtained. The antenna impedance tuning using measured values of the reflected waves may be referred to as CL-AIT or fine tuning.

Figure 5:
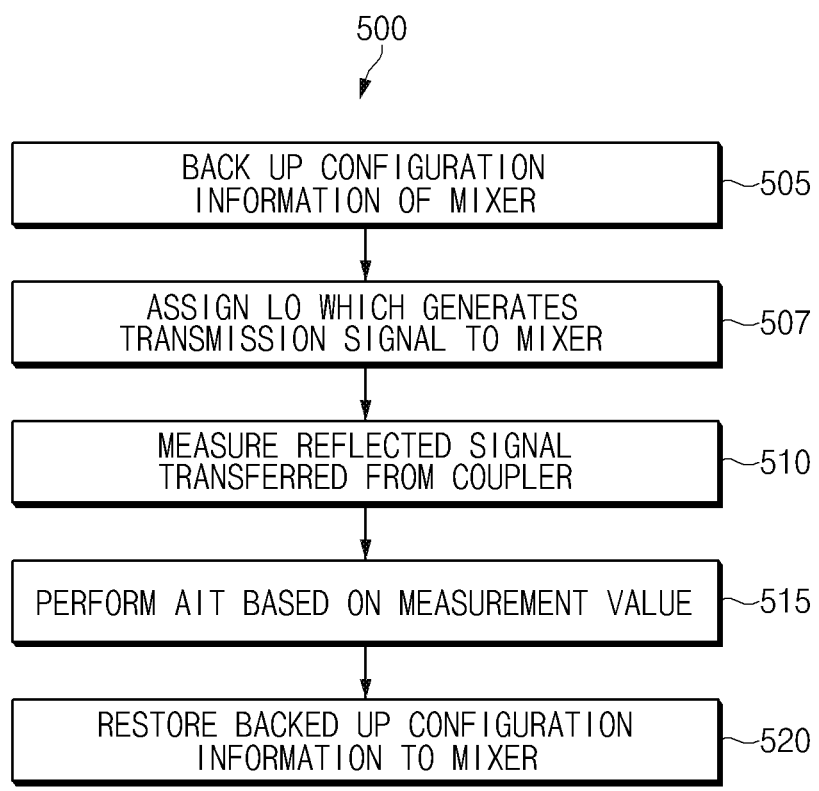
FIG. 5 is a method of an electronic device for performing closed loop (CL) antenna impedance tuning according to an embodiment of the disclosure.

FIG. 5 illustrates a method of an electronic device performing CL antenna impedance tuning according to an embodiment of the disclosure. The operations included in the method may be, for example, an embodiment of operation 315 of FIG. 3.

Referring to FIG. 5, in a method 500, at operation 505, the electronic device 101 may back up configuration information of a mixer assigned to an Scell. The configuration information may include, for example, information on an oscillator assigned for a CA operation. For example, referring to FIG. 2, when the N-th mixer 224-N and the M-th oscillator 226-M are assigned to the Scell, the configuration information of the N-th mixer 224-N may include information (e.g., an index) on the M-th oscillator 226-M.

In operation 507, the electronic device 101 may switch a coupler (e.g., the coupler 240 of FIG. 2) included in the electronic device 101 from a forward direction to a reverse direction, and assign an LO (e.g., the first oscillator 226-1 of FIG. 2), which generates a transmission signal, to a mixer assigned to the Scell.

In operation 510, the electronic device 101 may measure a reflected signal transferred from the coupler. For example, the electronic device 101 may obtain an I/Q value of a reflected wave using a feedback circuit (e.g., the feedback circuit 222 of FIG. 2) and a mixer assigned to the S cell.

In operation 515, the electronic device 101 may perform antenna impedance tuning based on a measured value (e.g., I/Q value).

In operation 520, the electronic device 101 may restore the backed up configuration information to the mixer assigned to the Scell. The electronic device 101 may perform a CA operation using the restored configuration information and the mixer assigned to the Scell. Although not illustrated in FIG. 5, according to an embodiment, the electronic device 101 may switch the coupler from the reverse direction to the forward direction before, after, or substantially simultaneously with operation 520.

Figure 6:
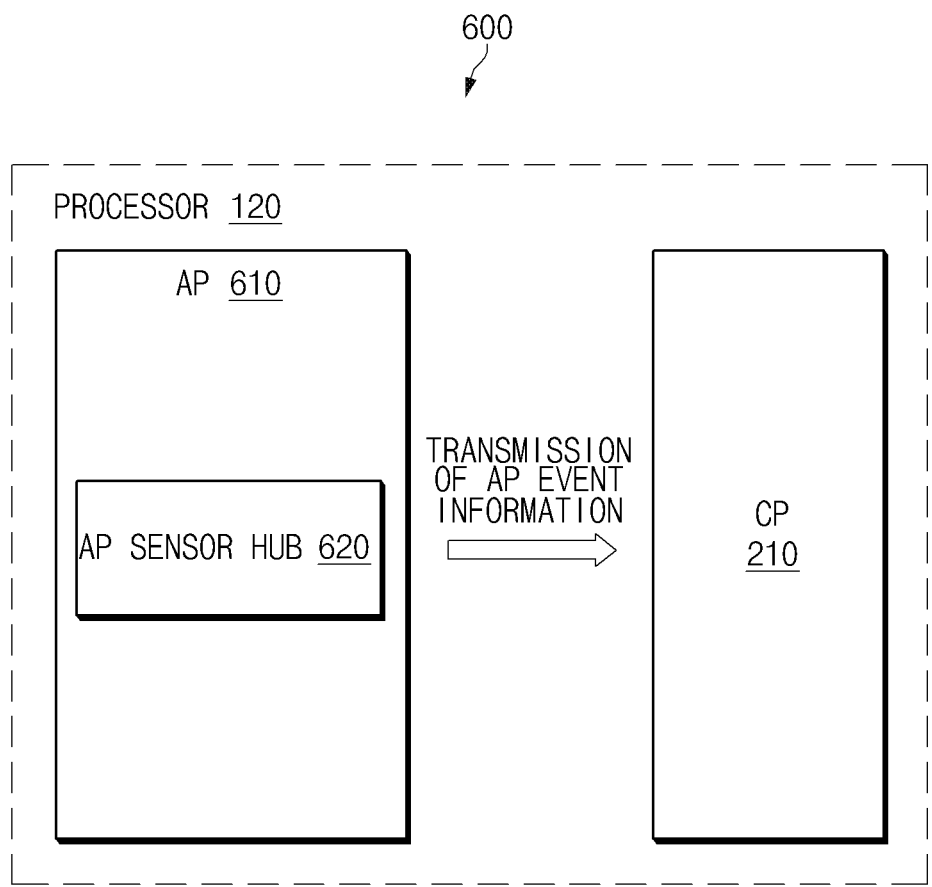
FIG. 6 is a block diagram illustrating some components of a processor according to an embodiment of the disclosure.

FIG. 6 illustrates a block diagram showing some components of a processor according to an embodiment of the disclosure.

Referring to FIG. 6, in a block diagram 600, the processor 120 may include an application processor (AP) 610 and the CP 210. Although the processor 120 is illustrated as a single module (or chip) including the AP 610 and the CP 210 in FIG. 6, according to other embodiments, the AP 610 and the CP 210 may be separate chips.

The electronic device 101 may store information (e.g., a lookup table) indicating relationships between various events related to degradation in antenna performance and antenna impedances through experiments performed in advance. For example, the lookup table may be expressed as Table 1 below.

TABLE 1

| Event type | antenna tune code(hex) |
| --- | --- |
| free space | 0x00000000 |
| universal serial bus (USB) | 0x00AA0000 |
| Earjack | 0x00BB0000 |
| on-the-go (OTG) gender | 0x00CC0000 |
| Grip | 0x00DD0000 |
| CA active | 0x00EE0000 |
| 4RxD/MIMO | 0x00FF0000 |

In Table 1, an antenna tune code may mean a parameter corresponding to an antenna impedance. 'Free space' may represent a state in which no event has occurred, 'USB' may represent a state in which a USB is connected to the electronic device, 'Earjack' may represent a state in which an earjack is connected to the electronic device, 'OTG gender' may represent a state in which an OTG gender is connected to the electronic device, 'Grip' may represent a user's grip state, 'CA active' may represent that CA is activated (or CA is running), and '4RxD/MIMO (multi-input multi-output)' may represent whether 4RxD/MIMO is activated. 'USB', 'Earjack', 'OTG gender' and/or 'Grip' (hereinafter, may be referred to as 'AP event') may be detected by the AP 610, and 'CA active' and/or '4RxD'/MIMO 'may be detected by the CP 210.

For example, when it is detected by the AP 610 that a USB is connected to the electronic device 101, the AP 610 may transfer a detected AP event to the CP 210. The CP 210 may tune an antenna impedance to a value corresponding to code 0x00AA0000 based on the received AP event and information in Table 1. Tuning the antenna impedance based on the detected event and the lookup table as shown in Table 1 may be referred to as OL-AIT or coarse tuning.

According to one embodiment, the AP 610 may detect an AP event through an AP sensor hub 620 (e.g., the sensor module 176 of FIG. 1) included in the AP 610 or included in the electronic device 101 as a separate module.

Figure 7:
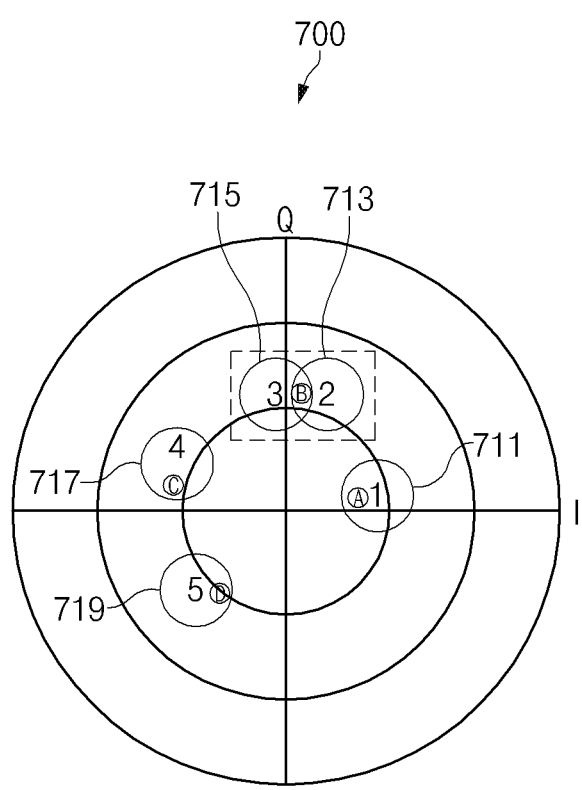
FIG. 7 is a graph illustrating an I/Q value of a reflected wave and a range of an event according to an embodiment of the disclosure.

FIG. 7 illustrates a graph showing a range of I/Q values A, B, C, and D of reflected signals and a range of events according to an embodiment of the disclosure.

The electronic device 101 may perform antenna impedance tuning based on an event, but the electronic device 101 may not detect a case where the antenna impedance is changed regardless of the event or accuracy in antenna impedance tuning based on the event may drop in some cases.

Referring to FIG. 7, in a graph 700, a first event 711, a second event 713, a third event 715, a fourth event 717, and a fifth event 719 each may correspond to one of the events in Table 1. The first range A, the second range B, the third range C, and the fourth range D may mean I/Q values of the antenna impedance changed due to various causes, respectively. When the I/Q value is changed to the first range A, the third range C, or the fourth range D, the electronic device 101 may perform antenna impedance tuning based on the information shown in Table 1 because each changed I/Q value is a range of the event (e.g., events 711, 717 or 719). When the I/Q value is changed to the second range B, the electronic device 101 may not know whether the antenna impedance is changed due to the second event 713 or the third event 715, so that the performance of the antenna may not be improved even when the electronic device 101 performs antenna impedance tuning.

The electronic device 101 according to various embodiments may compensate for limitations of each antenna impedance tuning by selectively performing CL-AIT or OL-AIT. For example, when the changed I/Q value is included in the range of one event (e.g., the first range A, the third range C, or the fourth range D), the electronic device 101 may perform OL-AIT. For another example, a changed I/Q value exists in a region where ranges of multiple events overlaps each other (e.g., the second range B) or the performance of OL-AIT (e.g., a switch for changing an impedance) is not identified (e.g., 713 and 715), the electronic device 101 may selectively apply CL-AIT or OL-AIT.

Figure 8:
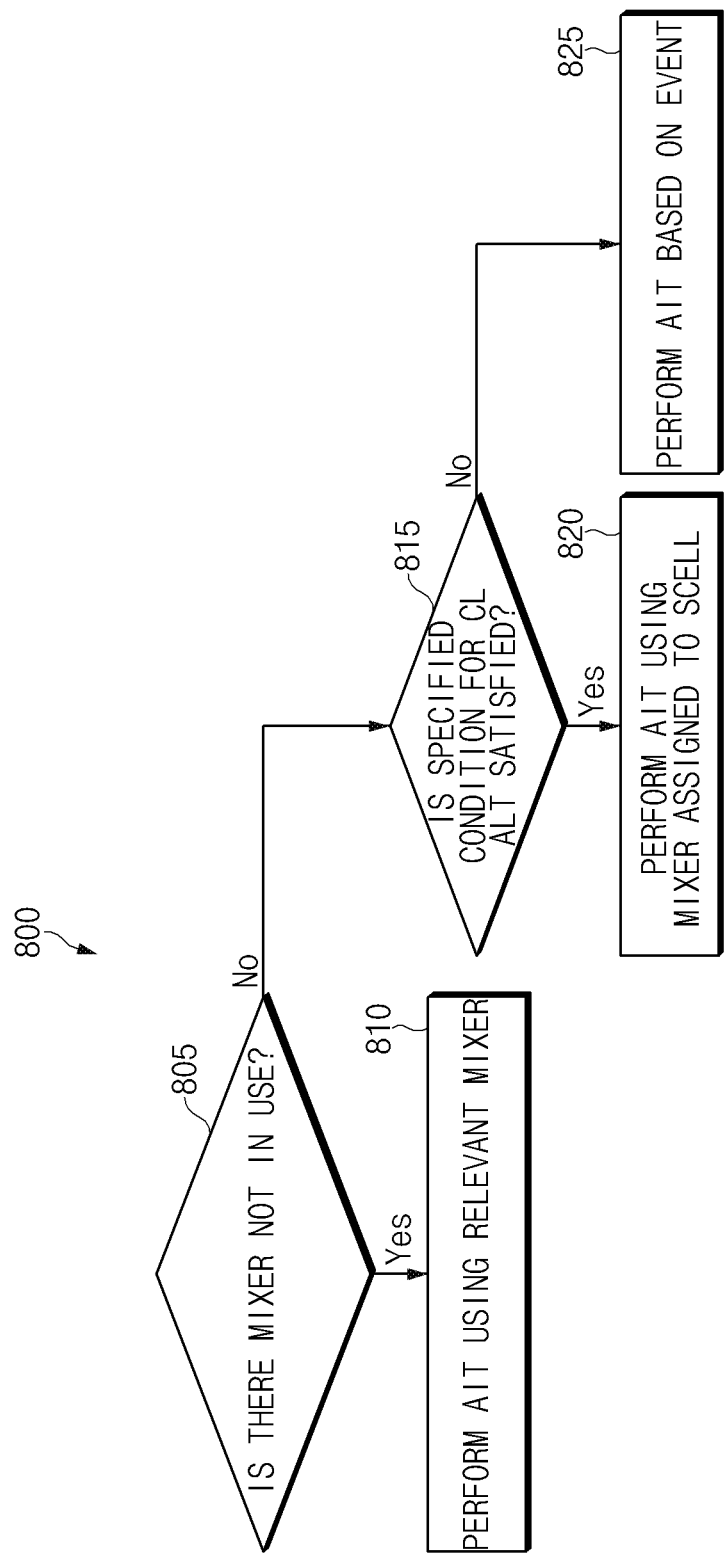
FIG. 8 is a method of an electronic device for performing antenna impedance tuning according to an embodiment of the disclosure.

FIG. 8 illustrates another method of an electronic device that performs antenna impedance tuning according to an embodiment of the disclosure.

Referring to FIG. 8, in a method 800, the electronic device 101 may identify whether there is a mixer that is not currently in use among a plurality of mixers included in an RFIC (e.g., the RFIC 220 of FIG. 2) (e.g., operation 305 of FIG. 3). When there is a mixer that is not currently in use ('YES' in operation 805), in operation 810, the electronic device 101 may perform antenna impedance tuning through the mixer (e.g., operation 310 in FIG. 3).

When all of the plurality of mixers included in the RFIC are in use ('NO' in operation 805), in operation 815, the electronic device 101 may identify whether a specified condition for CL-AIT is satisfied. The specified condition may include, for example, a condition that a frequency corresponding to a Pcell is a frequency at which setting for antenna impedance tuning is possible, a condition that the QoS service such as VoLTE is being used in the electronic device 101, or a condition that the Pcell satisfies a weak electric field condition.

For example, when the frequency corresponding to the Pcell is a frequency at which setting for antenna impedance tuning is possible ('YES' in operation 815), in operation 820, the electronic device 101 may perform antenna impedance tuning using a mixer assigned to the Scell (e.g., operation 315 of FIG. 3). When the frequency corresponding to the Pcell is not a frequency at which setting for antenna impedance tuning is possible ('NO' in operation 815), in operation 825, the electronic device 101 may perform event-based AIT (e.g., OL-AIT).

For another example, when a QoS service such as VoLTE is being used in the electronic device 101 ('YES' in operation 815), the quality of a voice call service may need to be guaranteed, and therefore, in operation 820, the electronic device 101 may perform antenna impedance tuning using a mixer assigned to the Scell. When a QoS service such as VoLTE is not being used in the electronic device 101 ("NO" in operation 815), in operation 825, the electronic device 101 may perform event-based AIT.

For another example, when the Pcell satisfies the weak electric field condition ('YES' in operation 815), in operation 820, the electronic device 101 may perform antenna impedance tuning using the mixer assigned to the Scell. When the Pcell satisfies the weak electric field condition, the reception of data does not occur in the Scell, or the magnitude of transmit power for measurement of a reflected wave may increase. Therefore, the electronic device 101 may measure CL-AIT using the reflected signal transferred from the coupler 240. According to an embodiment, the power of a transmission signal for the Pcell is greater than or equal to a threshold value, or a received signal strength in the Pcell (e.g., at least one of reference signal received power (RSRP), or block error rate (BLER)) is less than a threshold value, the electronic device 101 may determine that the Pcell satisfies the weak electric field condition.

When the Pcell does not satisfy the weak field condition ('NO' in operation 815), in operation 825, the electronic device 101 may perform event-based AIT.

Although operation 820 is illustrated as performing only antenna impedance tuning using a mixer, according to another embodiment, the electronic device 101 may perform antenna impedance tuning using a mixer and antenna impedance tuning based on an event together in operation 820. For example, referring to FIG. 7, when a changed I/Q value is included in the range of one event (e.g., the first range A, the third range C, or the fourth range D), the electronic device 101 may perform antenna impedance tuning based on an event, while when a changed I/Q value exists in a region where ranges of a plurality of events overlap each other (e.g., the second range B) or when the performance of OL-AIT (e.g., a switch for changing an impedance) is not identified (e.g., 713 and 715), the electronic device 101 may selectively apply CL-AIT or OL-AIT.

In addition to the embodiments illustrated in FIG. 8, the electronic device 101 according to various embodiments may combine a condition that CA is operating and a plurality of designated conditions for CL-AIT. For example, the electronic device 101 may perform antenna impedance tuning based on an event when one of specified conditions for CL-AIT is not satisfied although a mixer that is not currently in use exists. In addition, the electronic device 101 may perform CL-AIT based on a combination of at least two of a plurality of specified conditions for CL-AIT. An embodiment in which whether the CA is operating is determined and a plurality of specified conditions for CL-AIT are combined will be described later with reference to FIG. 9.

Figure 9:
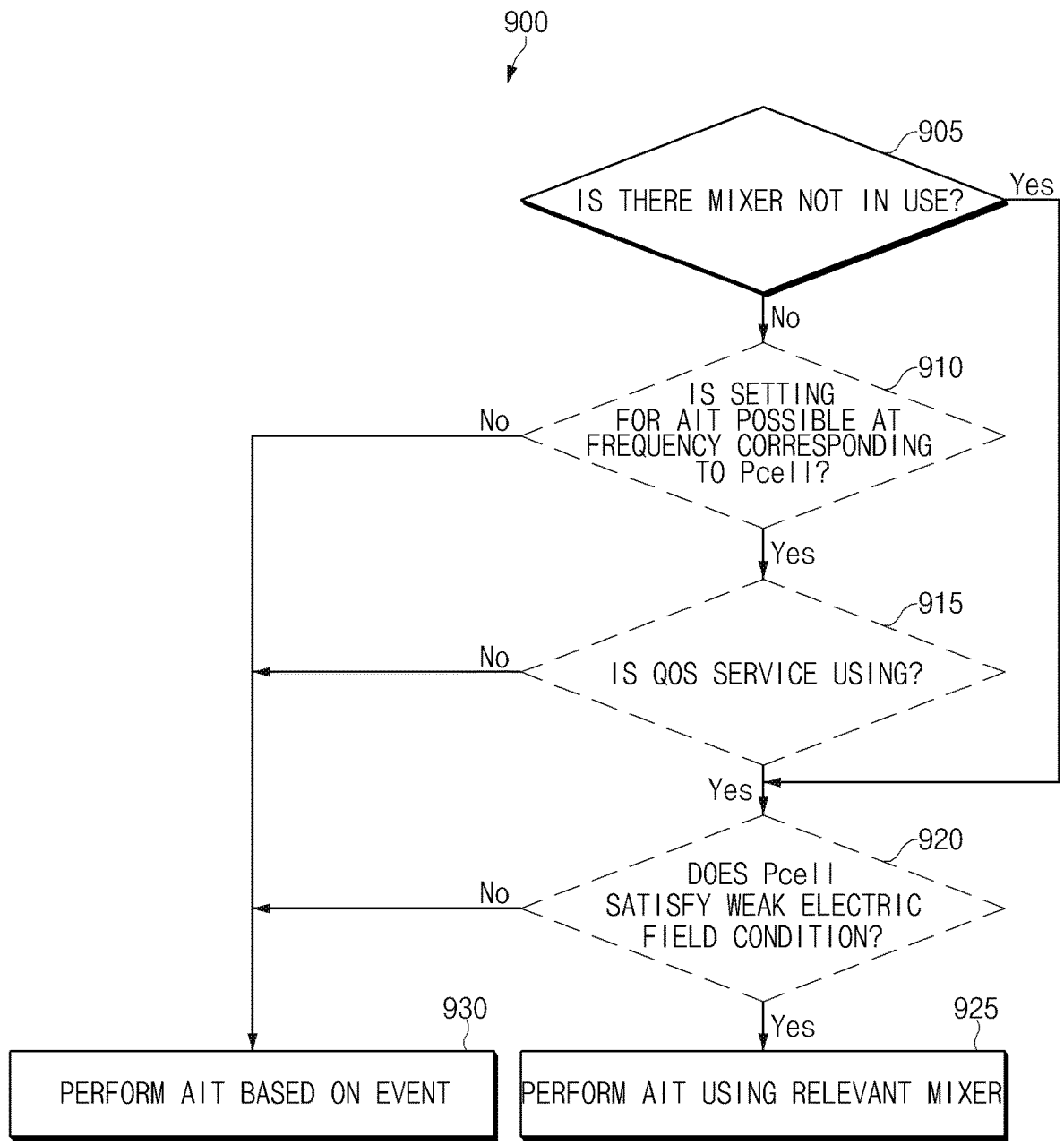
FIG. 9 is a method of an electronic device for performing antenna impedance tuning according to an embodiment of the disclosure.

FIG. 9 illustrates another method of an electronic device that performs antenna impedance tuning according to an embodiment of the disclosure.

Referring to FIG. 9, in a method 900, in operation 905, the electronic device 101 may identify whether there is a mixer that is not currently in use among a plurality of mixers included in an RFIC (e.g., the RFIC 220 of FIG. 2) (e.g., operation 305 of FIG. 3). When a mixer that is not currently in use exists ('YES' in operation 905), in operation 920, the electronic device 101 may identify whether a communication state for a Pcell is less than a threshold value.

When a plurality of mixers included in the RFIC are all in use ('NO' in operation 905), in operation 910, the electronic device 101 may identify whether a frequency corresponding to a Pcell is a frequency at which setting for antenna impedance tuning is possible. When the frequency corresponding to the Pcell is not a frequency at which setting for antenna impedance tuning is possible ('NO' in operation 910), in operation 930, the electronic device 101 may perform antenna impedance tuning based on an event.

When the frequency corresponding to the Pcell is a frequency at which setting for antenna impedance tuning is possible ('YES' in operation 910), in operation 915, the electronic device 101 may identify whether a QoS service is in use in the electronic device 101. When the QoS service is not in use ('NO' in operation 915), in operation 930, the electronic device 101 may perform antenna impedance tuning based on an event.

When the QoS service is in use, in operation 920, the electronic device 101 may identify whether the Pcell satisfies a weak electric field condition. When the Pcell does not satisfy the weak electric field condition ('NO' in operation 920), the electronic device 101 may perform antenna impedance tuning based on an event.

When the Pcell satisfies the weak electric field condition ('YES' in operation 920), in operation 925, the electronic device 101 may perform antenna impedance tuning using a mixer. For example, the electronic device 101 may perform antenna impedance tuning using a mixer which is assigned to the Scell or a mixer which is not in use. According to an embodiment, the electronic device 101 may perform antenna impedance tuning using a mixer and antenna impedance tuning based on an event together.

As described above, an electronic device for supporting carrier aggregation (CA) according to an embodiment may include a radio frequency integrated circuit (RFIC) (e.g., the RFIC 220 in FIG. 2) including a plurality of mixers (e.g., the mixers 224-1, 224-2, . . . , 224-N) (N is a natural number in FIG. 2) and a feedback circuit (e.g., the feedback circuit 222 in FIG. 2), at least one antenna (e.g., at least one of the antennas 250-1 or 250-2 in FIG. 2), a coupler (e.g., the coupler 240 in FIG. 2) disposed between the RFIC and the at least one antenna to transfer a reflected signal of a transmission signal to the feedback circuit, and at least one processor (e.g., at least one of the processor 120 in FIG. 1, the wireless communication module 192 in FIG. 1, the CP 210 in FIG. 2, or the AP 610 in FIG. 6) operatively connected to the RFIC, wherein the at least one processor may identify whether there is a mixer which is not in use among the plurality of mixers, and perform antenna impedance tuning through a first mixer and the feedback circuit when the first mixer (e.g., the first mixer 224-1 in FIG. 2) which is not in use among the plurality of mixers is not identified, or perform the antenna impedance tuning through a second mixer (e.g., the second mixer 224-2 or the N-th mixer 224-N in FIG. 2) assigned to a secondary cell (Scell) among the plurality of mixers and the feedback circuit when the plurality of mixers are all in use.

According to an embodiment, the at least one processor may back up configuration information on the second mixer when the plurality of mixers are all in use, perform the antenna impedance tuning through the second mixer when the backup is completed, and restore the backed up configuration information to the second mixer when the antenna impedance tuning is completed.

According to an embodiment, the RFIC may further include a plurality of oscillators (e.g., the oscillators 226-1 226-2, . . . , 226-M) (M is a natural number), and the at least one processor may back up information on a first oscillator (e.g., the M-th oscillator 226-M in FIG. 2) assigned to the Scell among the plurality of oscillators when the plurality of mixers are all in use, perform the antenna impedance tuning through a second oscillator (e.g., the first oscillator 226-1 in FIG. 2) configured to transmit the transmission signal among the plurality of oscillators and the second mixer when the backup is completed, and restore the backed up information on the first oscillator to the second mixer when the antenna impedance tuning is completed.

According to an embodiment, the electronic device may further include a sensor (e.g., at least a part of the sensor module 176 in FIG. 1) and the at least one processor may identify whether at least one of specified conditions for closed loop (CL) antenna impedance tuning is satisfied when the plurality of mixers are all in use, perform the antenna impedance tuning using the second mixer and the feedback circuit when the at least one of the specified conditions is satisfied, and perform the antenna impedance tuning based on an event detected through a sensor when the specified conditions are not satisfied.

According to an embodiment, the specified conditions may include at least one of a condition that a frequency corresponding to a primary cell (Pcell) is a frequency at which setting for antenna impedance tuning is possible, a condition that the electronic device is using a quality of service (QoS) service, or a condition that the Pcell satisfies a weak electric field condition.

According to an embodiment, the at least one processor may determine that the QoS service is in use when the electronic device is using a voice over long term evolution (VoLTE) service.

According to an embodiment, the at least one processor may perform the antenna impedance tuning based on an event detected through the second mixer, the feedback circuit and the sensor when the at least one of the specified conditions is satisfied.

According to an embodiment, the at least one processor may include a communication processor (CP) and an application processor (AP).

As described above, according to an embodiment, a method for supporting carrier aggregation (CA) in an electronic device may include identifying whether there is a mixer which is not in use among a plurality of mixers included in the electronic device; and performing antenna impedance tuning (AIT) through a first mixer when the first mixer which is not in use among the plurality of mixers is identified; or performing the antenna impedance tuning through a second mixer assigned to a secondary cell (Scell) among the plurality of mixers when the plurality of mixers are all in use.

According to an embodiment, the performing of the antenna impedance tuning may include backing up configuration information on the second mixer when the plurality of mixers are all in use, assigning a first oscillator configured to generate a transmission signal among a plurality of oscillators of the electronic device to the second mixer when the backup is completed, performing the antenna impedance tuning through the second mixer, and restoring the backed up configuration information to the second mixer when the antenna impedance tuning is completed.

According to an embodiment, the configuration information may include information on a second oscillator assigned to the Scell among the plurality of oscillators.

According to an embodiment, the method may further include identifying, by the electronic device, whether at least one of specified conditions for closed loop (CL)-AIT is satisfied when the plurality of mixers are all in use, and performing the antenna impedance tuning using the second mixer when the at least one of the specified conditions is satisfied, or performing the antenna impedance tuning based on an event detected through a sensor when the specified conditions are not satisfied.

According to an embodiment, the specified conditions may include at least one of a condition that a frequency corresponding to a primary cell (Pcell) is a frequency at which setting for antenna impedance tuning is possible, a condition that the electronic device is using a quality of service (QoS) service, or a condition that the Pcell satisfies a weak electric field condition.

According to an embodiment, the event may include at least one of a state in which a universal serial bus is connected to the electronic device, a state in which an earjack is connected to the electronic device, a state in which an on-the-go (OTG) gender is connected to the electronic device, or a state in which a grip by a user is detected.

According to an embodiment, the method may further include performing the antenna impedance tuning using the second mixer and the antenna impedance tuning based on the event when the at least one of the specified conditions is satisfied.

As described above, according to an embodiment, an electronic device (e.g., the electronic device 101 in FIG. 1) for supporting carrier aggregation (CA) may include a sensor (e.g., at least a part of the sensor module 176 in FIG. 1), a radio frequency integrated circuit (RFIC) (e.g., the RFIC 220 in FIG. 2) including a plurality of mixers (e.g., the mixers 224-1, 224-2, . . . , 224-N) (N is a natural number in FIG. 2) and a feedback circuit (e.g., the feedback circuit 222 in FIG. 2), at least one antenna (e.g., at least one of the antennas 250-1 or 250-2 in FIG. 2), a coupler (e.g., the coupler 240 in FIG. 2) disposed between the RFIC and the at least one antenna to transfer a reflected signal of a transmission signal to the feedback circuit, at least one processor (e.g., at least one of the processor 120 in FIG. 1, the wireless communication module 192 in FIG. 1, the CP 210 in FIG. 2, or the AP 610 in FIG. 6) operatively connected to the sensor and the RFIC, and the at least one processor may identify whether there is a mixer which is in use among the plurality of mixers, performing antenna impedance tuning (AIT) through a first mixer (e.g., the first mixer 224-1 in FIG. 2) and the feedback circuit when the first mixer which is not in use among the plurality of mixers is identified, or identify whether at least one of specified conditions for closed loop (CL) antenna impedance tuning is satisfied when the plurality of mixers are all in use, perform the antenna impedance tuning using a second mixer (e.g., the second mixer 224-2 or the N-th mixer 224-N in FIG. 2) assigned to a secondary cell (Scell) among the plurality of mixers and the feedback circuit when the at least one of the specified conditions is satisfied, and perform the antenna impedance tuning based on an event detected through the sensor when the specified conditions are not satisfied.

According to an embodiment, the at least one processor may back up configuration information on the second mixer, perform the antenna impedance tuning through the second mixer when the backup is completed, and restore the backed up configuration information to the second mixer when the antenna impedance tuning is completed.

According to an embodiment, the specified conditions may include at least one of a condition that a frequency corresponding to a primary cell (Pcell) is a frequency at which setting for antenna impedance tuning is possible, a condition that the electronic device is using a quality of service (QoS) service, or a condition that the Pcell satisfies a weak electric field condition.

According to an embodiment, the event may include at least one of a state in which a universal serial bus is connected to the electronic device, a state in which an earjack is connected to the electronic device, a state in which an on-the-go (OTG) gender is connected to the electronic device, or a state in which a grip by a user is detected.

According to an embodiment, the at least one processor may include a communication processor (CP) (e.g., the CP 210 in FIG. 2) and an application processor (AP) (e.g., the AP 610 in FIG. 6).

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to various embodiments herein, the electronic device may provide a high quality of voice call service by optimizing the performance of the antenna without including a dedicated mixer.

According to various embodiments herein, the electronic device may selectively control a plurality of mixers to secure antenna performance and minimize influence on a CA (carrier aggregation) operation.

In addition, various effects may be provided that are directly or indirectly understood through the disclosure.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device for supporting carrier aggregation, the electronic device comprising:
   a radio frequency integrated circuit (RFIC) comprising a plurality of mixers and a feedback circuit;
   at least one antenna;
   a coupler disposed between the RFIC and the at least one antenna and transferring a reflected signal of a transmission signal to the feedback circuit; and
   at least one processor operatively connected to the RFIC, wherein the at least one processor is configured to:
      identify whether there is a mixer which is not in use among the plurality of mixers,
      when a first mixer which is not in use among the plurality of mixers is identified, perform antenna impedance tuning through the first mixer and the feedback circuit, and
      when the plurality of mixers are all identified as in use, perform the antenna impedance tuning through a second mixer assigned to a secondary cell (Scell) among the plurality of mixers and the feedback circuit.

2. The electronic device of claim 1, wherein the at least one processor is further configured to:
   back up configuration information on the second mixer when the plurality of mixers are all in use,
   perform the antenna impedance tuning through the second mixer when the back up is completed, and restore the backed up configuration information to the second mixer when the antenna impedance tuning is completed.

3. The electronic device of claim 2,
wherein the RFIC further comprises a plurality of oscillators, and
wherein the at least one processor is further configured to:
back up information on a first oscillator assigned to the Scell among the plurality of oscillators when the plurality of mixers are all in use,
perform the antenna impedance tuning through a second oscillator configured to transmit the transmission signal among the plurality of oscillators and the second mixer when the backup is completed, and
restore the backed up information on the first oscillator to the second mixer when the antenna impedance tuning is completed.

4. The electronic device of claim 2, wherein the at least one processor is further configured to:
identify whether at least one of specified conditions for a closed loop (CL) antenna impedance tuning is satisfied when the plurality of mixers are all in use,
perform the antenna impedance tuning using the second mixer and the feedback circuit when the at least one of the specified conditions is satisfied, and
perform the antenna impedance tuning based on an event detected through a sensor when the specified conditions are not satisfied.

5. The electronic device of claim 4, wherein the specified conditions comprise at least one of a condition that a frequency corresponding to a primary cell (Pcell) is a frequency at which setting for antenna impedance tuning is possible, a condition that the electronic device is using a quality of service (QoS) service, or a condition that the Pcell satisfies a weak electric field condition.

6. The electronic device of claim 5, wherein the at least one processor is further configured to determine that the QoS service is in use when the electronic device is using a voice over long term evolution (VoLTE) service.

7. The electronic device of claim 4, wherein the at least one processor is further configured to perform the antenna impedance tuning based on an event detected through the second mixer, the feedback circuit and the sensor when the at least one of the specified conditions is satisfied.

8. The electronic device of claim 4, wherein the at least one processor comprises a communication processor (CP) and an application processor (AP).

9. A method of supporting carrier aggregation (CA) in an electronic device, the method comprising:
identifying whether there is a mixer which is not in use among a plurality of mixers included in the electronic device;
when a first mixer which is not in use among the plurality of mixers is identified, performing antenna impedance tuning (AIT) through the first mixer; and
when the plurality of mixers are all identified as in use, performing the antenna impedance tuning through a second mixer assigned to a secondary cell (Scell) among the plurality of mixers.

10. The method of claim 9, wherein the performing of the antenna impedance tuning comprises:
backing up configuration information on the second mixer when the plurality of mixers are all in use;
assigning a first oscillator configured to generate a transmission signal among a plurality of oscillators of the electronic device to the second mixer when the backing up is completed;
perform the antenna impedance tuning through the second mixer; and
restore the backed up configuration information to the second mixer when the antenna impedance tuning is completed.

11. The method of claim 9, wherein the configuration information comprises information on a second oscillator assigned to the Scell among the plurality of oscillators.

12. The method of claim 9, further comprising:
identifying, by the electronic device, whether at least one of specified conditions for closed loop (CL)-AIT is satisfied when the plurality of mixers are all in use;
performing the antenna impedance tuning using the second mixer when the at least one of the specified conditions is satisfied; or
performing the antenna impedance tuning based on an event detected through a sensor when the specified conditions are not satisfied.

13. The method of claim 12, wherein the specified conditions comprise at least one of a condition that a frequency corresponding to a primary cell (Pcell) is a frequency at which setting for antenna impedance tuning is possible, a condition that the electronic device is using a quality of service (QoS) service, or a condition that the Pcell satisfies a weak electric field condition.

14. The method of claim 12, wherein the event comprises at least one of a state in which a universal serial bus is connected to the electronic device, a state in which an earjack is connected to the electronic device, a state in which an on-the-go (OTG) gender is connected to the electronic device, or a state in which a grip by a user is detected.

15. The method of claim 12, further comprising:
performing the antenna impedance tuning using the second mixer and the antenna impedance tuning based on the event when the at least one of the specified conditions is satisfied.

16. An electronic device for supporting carrier aggregation (CA), the electronic device comprising:
a sensor;
a radio frequency integrated circuit (RFIC) comprising a plurality of mixers and a feedback circuit;
at least one antenna;
a coupler disposed between the RFIC and the at least one antenna and transferring a reflected signal of a transmission signal to the feedback circuit; and
at least one processor operatively connected to the sensor and the RFIC, wherein the at least one processor is configured to:
identify whether a mixer which is not in use among the plurality of mixers,
when a first mixer which is not in use among the plurality of mixers is identified, perform antenna impedance tuning (AIT) through the first mixer and the feedback circuit, and
when all the plurality of mixers are identified as in use:
identify whether at least one of specified conditions for closed loop (CL) antenna impedance tuning is satisfied,
perform the antenna impedance tuning using a second mixer assigned to a secondary cell (Scell) among the plurality of mixers and the feedback circuit when the at least one of the specified conditions is satisfied, and
perform the antenna impedance tuning based on an event detected through the sensor when the specified conditions are not satisfied.

17. The electronic device of claim 16, wherein the at least one processor is further configured to:
- back up configuration information on the second mixer,
- perform the antenna impedance tuning through the second mixer when the backup is completed, and
- restore the backed up configuration information to the second mixer when the antenna impedance tuning is completed.

18. The electronic device of claim 16, wherein the specified conditions comprise at least one of a condition that a frequency corresponding to a primary cell (Pcell) is a frequency at which setting for antenna impedance tuning is possible, a condition that the electronic device is using a quality of service (QoS) service, or a condition that the Pcell satisfies a weak electric field condition.

19. The electronic device of claim 16, wherein the event comprises at least one of a state in which a universal serial bus is connected to the electronic device, a state in which an earjack is connected to the electronic device, a state in which an on-the-go (OTG) gender is connected to the electronic device, or a state in which a grip by a user is detected.

20. The electronic device of claim 16, wherein the at least one processor comprises a communication processor (CP) and an application processor (AP).

* * * * *